No. 758,186. PATENTED APR. 26, 1904.
M. MABREY.
CAR BRAKE.
APPLICATION FILED DEC. 26, 1902.
NO MODEL. 2 SHEETS—SHEET 1.

Witnesses
Fred R. Bowett.
David D. Duggan

Inventor
Morton Mabrey.
by F. M. Metcalf
Attorney.

No. 758,186. PATENTED APR. 26, 1904.
M. MABREY.
CAR BRAKE.
APPLICATION FILED DEC. 26, 1902.
NO MODEL. 2 SHEETS—SHEET 2.

Witnesses
Fred R. Dowrett.
David D. Duggan

Inventor.
Morton Mabrey
by F. M. Metcalf
Attorney.

No. 758,186. Patented April 26, 1904.

UNITED STATES PATENT OFFICE.

MORTON MABREY, OF BATTLECREEK, MICHIGAN, ASSIGNOR OF ONE-HALF TO DANIEL D. DUGGAN, OF BATTLECREEK, MICHIGAN.

CAR-BRAKE.

SPECIFICATION forming part of Letters Patent No. 758,186, dated April 26, 1904.

Application filed December 26, 1902. Serial No. 136,542. (No model.)

*To all whom it may concern:*

Be it known that I, MORTON MABREY, a citizen of the United States, residing at Battlecreek, in the county of Calhoun and State of Michigan, have invented certain new and useful Improvements in Car-Brakes, of which the following is a specification, reference being had therein to the accompanying drawings.

This invention relates to that class of brakes for electric or other cars in which the inertia or momentum of the car is utilized to bring the same to a stop; and the object is to provide a simple, certain, and powerful means of accomplishing the purpose.

I am aware that friction-clutches and other similar devices have been heretofore used for operating brakes of this type; but the arrangement has been such as to produce serious objections to the practical application and adoption of the method. In some of them the clutches were so constructed that the presence of dirt or grit on the clutch-shoes would "set" the clutch so firmly that the brakes could not be released, and in others the parts are liable to become inoperative through the effect of dampness or ice on the frictional surfaces, thus either preventing the application of the brakes entirely or at best applying them with very little pressure.

In my improved brake I employ a clutch of such form and arrangement of parts that the members cannot become set to prevent release, and at the same time it insures a braking effect of any desired force at the instant command of the operator.

Figure 1:
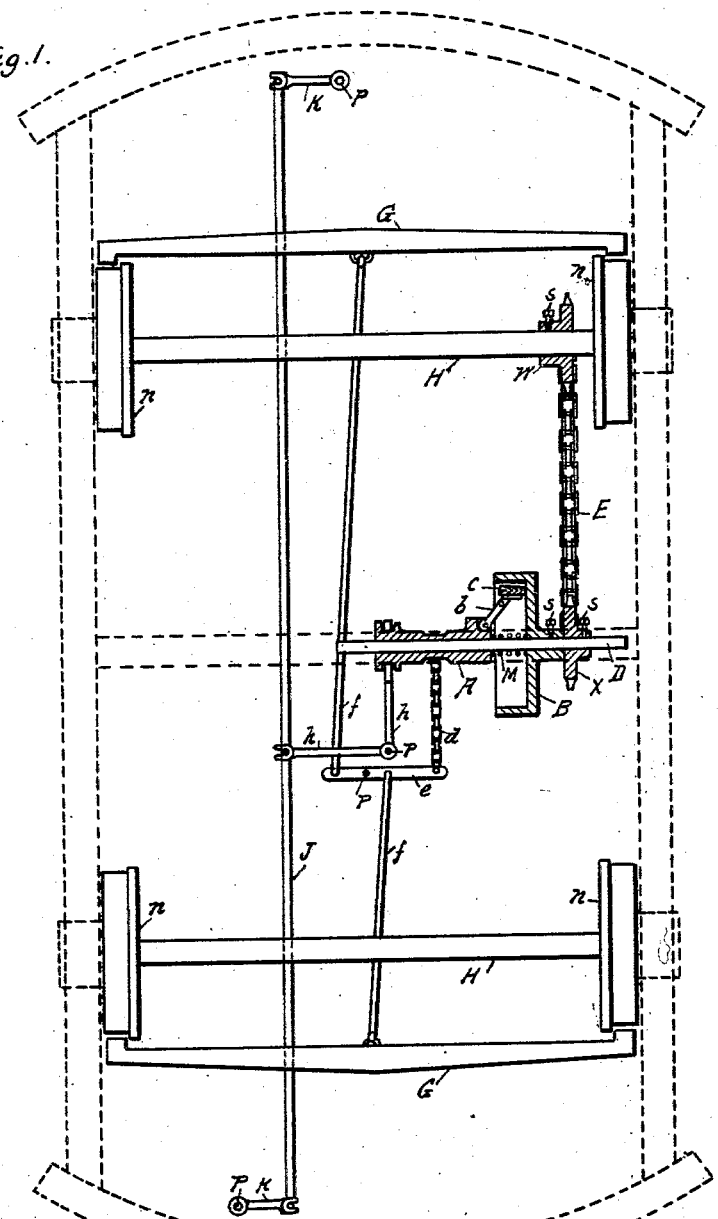
Figure 3:
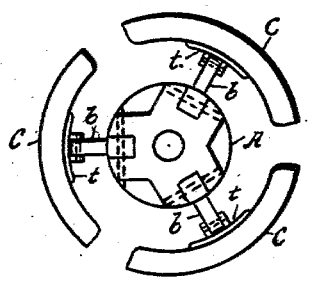
Figure 4:
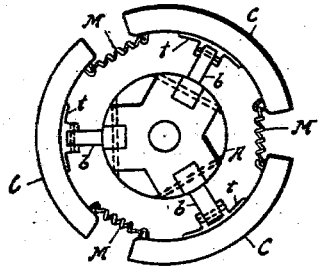
Figure 2:
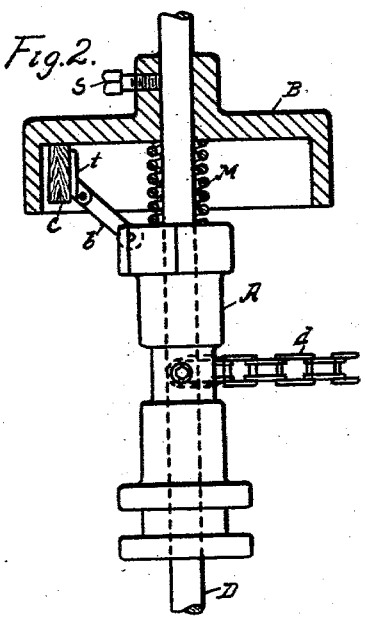
Figure 5:
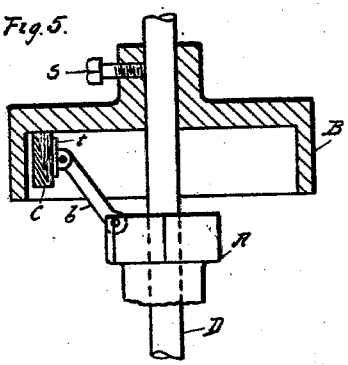

In the accompanying drawings, in which like letters of reference denote similar parts, Figure 1 represents a plan of the running-gear of an ordinary four-wheel car with my improved brake attached. Figs. 2 and 5 represent the friction-clutch mechanism and arrangement of operating parts. Figs. 3 and 4 are end views of the clutch-hub with arms and shoes attached.

A represents the sliding hub of clutch with arms *b* and shoes *c* attached.

*d* is the chain connecting brake-lever *e* with clutch-hub A.

*f f* are brake-rods, and G G brake-beams.

*h* is the clutch-lever or bell-crank, J the shifting rod operating from either end of the car by lever-cranks *k k*.

*p p p p* are pivotal points of levers.

*n n n n* are the car-wheels, and H H the axles.

*w* is a sprocket-wheel firmly attached to one of the car-axles H and driving the counter-shaft D by means of wheel *x* and chain E.

B is a friction-wheel attached to counter-shaft D, having a straight internal peripheral bearing for clutch-shoes *c* and a true face-bearing to receive end thrust from the same.

M M M M are springs holding the sliding hub and its arm and shoe attachments normally away from and out of engagement with the interior surfaces in B.

*t t t* are clutch-arm plates to which the clutch-shoes are attached.

*s s s s* are set-screw fastenings to the various shafts.

The operation is as follows: When the car is in motion and the several parts of running-gear and brake as shown in Fig. 1, the counter-shaft is rotating freely within its bearings and the sliding clutch-hub A and the brakes are out of engagement. To apply the brakes, the shifting rod J is given a longitudinal movement by means of the lever-cranks *k k* at either end of the car in the proper direction, these cranks being connected to vertical shafts having hand-wheels or cranks in convenient reach of the motorman at his station for this purpose. This operation will obviously move the sliding hub A toward the friction-wheel B by means of the bell-crank lever *h* and produce frictional contact between the clutch-shoes and interior of rim in just the degree to which force is applied to these connections. When the clutch-hub becomes engaged with the friction-wheel, the rotary motion of same winds up the chain-connecting hub and brake-lever, thus drawing the brake-beams together and applying the brakes.

In the construction of the clutch mechanism the parts are disposed so that a very slight transverse movement of the hub upon the counter-shaft shall expand the shoes of clutch-arms against the interior of the wheelrim, and while out of engagement the ends of the shoes shall just lightly bear against the vertical face inside of same and maintained in this free position by the tension of spring M. By these means a positive engagement or release of the clutch action is secured with small movement of the connecting parts. As the frictional surfaces of the clutch are parallel with the axis, it is impossible that the parts could wedge or lock together and thus prevent release.

Having thus fully described and illustrated my invention, what I claim as new, and desire to secure by United States Letters Patent, is—

In a car-brake, the counter-shaft mounted between the trucks, sprocket wheels and chain arranged to rotate the same continuously from one of the axles, a friction-wheel secured to the counter-shaft having interior bearing-surfaces for arm-shoes both parallel and at right angles to its axis, a clutch-hub sliding freely upon the counter-shaft, having three pivoted radial arms with terminal shoes bearing within the interior flange of the friction-wheel, and also against the vertical inside face of same, a spring operating to separate the hub and wheel, and springs operating to draw the shoes together, a chain attached to the barrel of hub and connected to the brake-beams by lever and rod attachments, a groove in the hub and a pivoted yoke having a bell-crank-lever terminal engaging the same, a shifting rod passing longitudinally underneath the car connected to the yoke-lever of the clutch, and the cranks from brake-wheel shafts at either end of the car, the whole constructed and arranged as shown and described.

In testimony whereof I affix my signature in presence of two witnesses.

MORTON MABREY.

Witnesses:
 FRED R. DOWSETT,
 DAVID D. DUGGAN.